United States Patent [19]

Miramon

[11] Patent Number: 5,779,082
[45] Date of Patent: Jul. 14, 1998

[54] EASILY-CLEANED REUSABLE LID INCLUDING AN EVACUATING PUMP

[75] Inventor: Eric J. Miramon, Los Osos, Calif.

[73] Assignee: Invental Laboratory, Inc., Atascadero, Calif.

[21] Appl. No.: 699,159

[22] Filed: Aug. 16, 1996

Related U.S. Application Data

[63] Continuation-in-part of Ser. No. 419,193, Apr. 10, 1995, Pat. No. 5,546,997, which is a continuation-in-part of Ser. No. 49,005, Apr. 19, 1993, Pat. No. 5,406,992.

[51] Int. Cl.$^6$ .................................................. B65D 31/04
[52] U.S. Cl. ...................... 220/212; 220/231; 220/240; 220/367.1; 215/228; 215/262; 215/270; 141/64; 141/65; 417/545
[58] Field of Search .......................... 220/212, 231, 220/240, 203.11, 203.23, 203.27, 203.28, 203.29, 367.1, 374; 215/228, 260, 262, 270, 311, 315; 141/63, 64, 65, 69; 417/234, 545, 554

[56] References Cited

U.S. PATENT DOCUMENTS

| | | | |
|---|---|---|---|
| 5,390,809 | 2/1995 | Lin | 220/212 |
| 5,406,992 | 4/1995 | Miramon | 141/65 |
| 5,546,997 | 8/1996 | Miramon | 141/65 |
| 5,558,243 | 9/1996 | Chu | 220/212 |
| 5,564,480 | 10/1996 | Chen | 141/65 |
| 5,564,581 | 10/1996 | Lin | 215/228 |

*Primary Examiner*—Stephen Cronin
*Attorney, Agent, or Firm*—Daniel C. McKown

[57] ABSTRACT

The lid consists of two unitary parts both of which are molded from a soft rubbery substance. The body of the lid butts against the mouth of a container and includes a vacuum release valve and a check valve through which air may be evacuated from the container. The second part is a bellows pump that sealingly engages the body of the lid. As the bellows pump is worked manually, air is drawn from the container into the pump through the check valve on the body of the lid and the air is then discharged into the atmosphere through a second check valve that is an integral portion of the removable bellows pump. Because of its simplicity and lack of small parts, the lid is easy to clean effectively, and reuse is contemplated. The actuators for the pump and for the vacuum release valve extend to the periphery of the lid thereby making it easy for use by handicapped persons.

9 Claims, 3 Drawing Sheets

5,779,082

EASILY-CLEANED REUSABLE LID INCLUDING AN EVACUATING PUMP

REFERENCE TO RELATED APPLICATION

The present application is a continuation-in-part of U.S. patent application Ser. No. 08/419,193 filed Apr. 10, 1995 for "Easily-cleaned Reusable Lid Including an Evacuating Pump", to be issued on Aug. 20, 1996 as U.S. Pat. No. 5,546,997, which was a continuation-in-part of U.S. patent application Ser. No. 08/049,005 filed Apr. 19, 1993 for "Self-contained Evacuation Lid" issued Apr. 18, 1995 as U.S. Pat. No. 5,406,992. The disclosures of these patents are incorporated herein by reference.

BACKGROUND OF THE INVENTION

1. Field of the Invention

The present invention is in the field of containers and more particularly relates to a lid for a container, the lid having a shape that facilitates stacking of the containers, having a structure that permits it to be cleaned for reuse, and having an integral pump for use in evacuating air from the container. The design of the lid facilitates its use by handicapped persons.

2. The Prior Art

The nearest known prior art is U.S. Pat. No. 2,890,810 issued Jun. 16, 1959 to Rohling. This patent discloses a vacuum pump that is an integral part of a lid that is removable from a container. The vacuum pump includes a chamber closed on one side by a deformable membrane. A force applied manually against the deformable membrane reduces the volume of the chamber, thereby forcing air out of it through a flapper valve. When the manually-applied force is released, the chamber expands to its original size, with the assistance of a compressed spring in one embodiment or by the elasticity of the membrane in another embodiment, while air is drawn into the chamber from the container through a second flapper valve. The patent describes the cementing together of its parts. Although a protective disc is provided to shield the air intake from the contents of the container, it is clear that some of the contents could lodge under the disc or could splash into the air intake and be drawn into the pump, where they might decay or impart an undesirable taste to food that is later stored in the container.

To the present inventor it seems axiomatic that if the lid is to be reusable then it must be easily cleaned to avoid contamination of later-stored contents.

In U.S. Pat. No. 3,672,114, issued Jun. 27, 1972, Sacks describes a device for evacuating containers. In his device a bellows is cemented to a lid. A flap-type check valve is provided at each end of the bellows, which is manually operated to evacuate the container. The presence of the bellows makes it unlikely that the containers can be stacked.

In U.S. Pat. No. 4,016,999, issued Apr. 12, 1977, Denzer describes a piston-type pump that is part of the lid. Denzer also provides a vent for relieving the vacuum.

In U.S. Pat. No. 4,249,583 issued Feb. 10, 1981, Lundbladh describes a device for evacuating a container. Although his device bears a superficial similarity to that of Denzer, the crucial difference is that in Lundbladh the piston-type pump is separable from the lid which makes it practical to stack the evacuated containers.

In U.S. Pat. No. 4,278,114 issued Jul. 14, 1981, Ruberg describes a pump that, like Lundbladh's, is separable from the lid of the container to facilitate stacking of the containers. However, Ruberg's pump, unlike that of Lundbladh, is arranged so that the suction stroke occurs as the piston is pushed toward the lid so that the force applied to the piston is transmitted to the seal between the pump and the lid thereby producing a stronger sealing action.

As will be seen below, the pump of the present invention is intended to remain a part of the lid and in this regard the present invention more nearly resembles that of Rohling. However, unlike the lid of Rohling, the lid of the present invention is structured in such a way that it can readily be disassembled for cleaning.

SUMMARY OF THE INVENTION

The present invention is a lid of a type that is reusable and that includes a built-in evacuation pump.

The present invention differs from other lids of this type in two main ways.

First, the lid of the present invention is easily taken apart for cleaning and is easily reassembled for reuse. This is made possible by the use of snap-in components.

Second, the lid of the present invention is easier for physically handicapped persons to use. This is achieved by locating the actuating levers for the pump and for the vent at the periphery of the lid where it is easy to apply an actuating force to them.

In addition to these advantages, the lid of the present invention does not interfere with stacking of the containers to which the lids are affixed.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
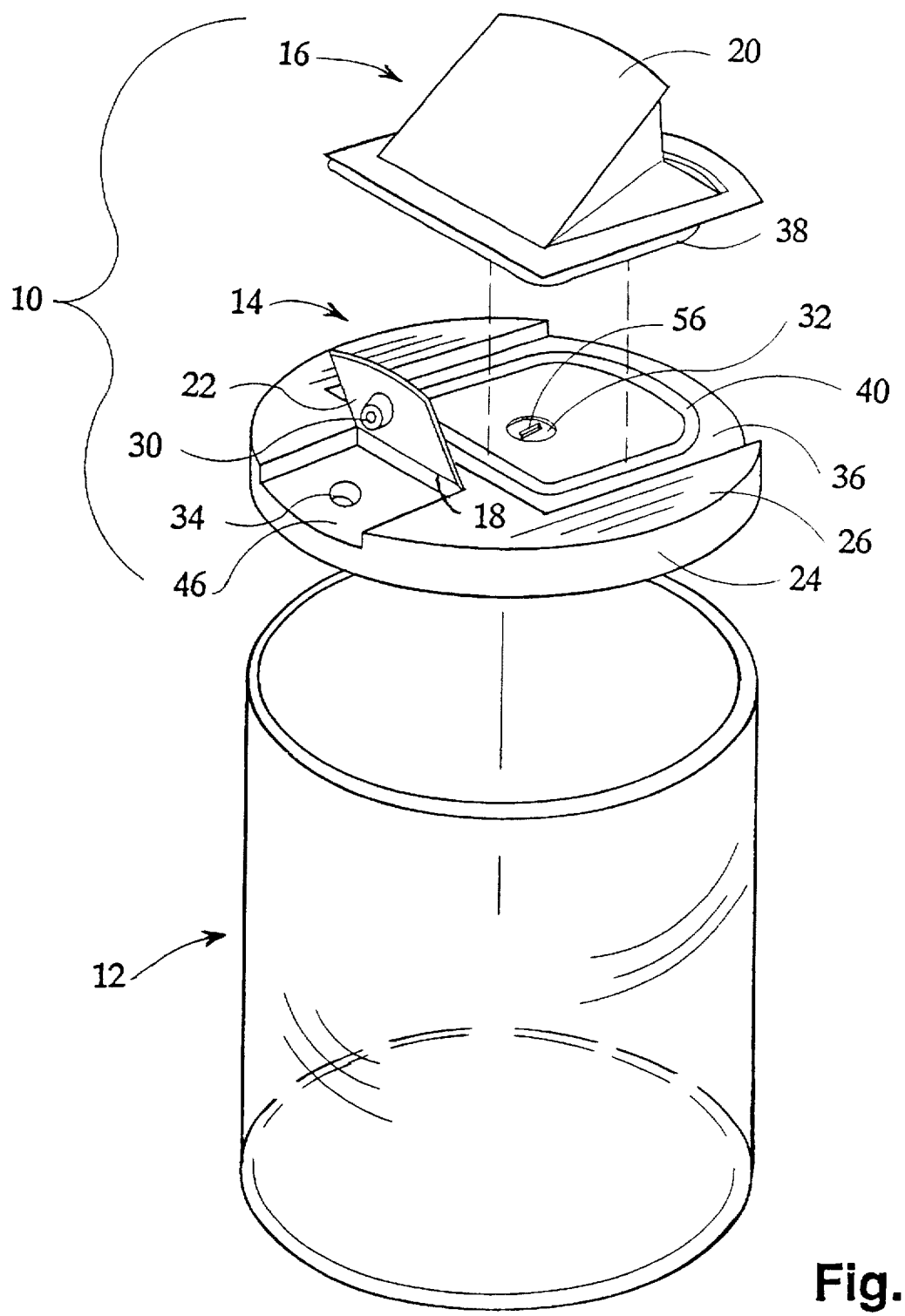
FIG. 1 is an exploded perspective view showing how the components of the lid are assembled and installed on a container.

FIG. 1 is an exploded perspective view showing the easily-cleaned reusable lid 10 and a container on which the lid is used. In the preferred embodiment of the invention, the lid 10 includes a lid body 14 and a removable pump 16. Thus, in the preferred embodiment the lid 10 consists of only two separable parts, namely, the body 14 of the lid, and the removable pump 16. Both the body 14 and the removable pump 16 are large enough that they are unlikely to be misplaced when those parts have been separated for cleaning. The design of an easily-cleaned reusable lid that consists of only two separable parts is considered to be a major achievement. The lid described in U.S. Pat. No. 5,546,997 consisted of five separable parts, by way of comparison.

In the preferred embodiment, both the body 14 and the removable pump 16 are molded of SANTOPRENE®, a plasticized rubber. SANTOPRENE® is a registered trademark of Monsanto Company of Saint Louis, Mo. The use of this material permits the lid to withstand freezing to minus 40° F. and heating to 300° F.

The body 14 includes two holes that extend completely through it. The first hole 32 contains a check valve that permits air to flow from the container 12 into the removable pump 16. The second hole 34 is used for relieving the internal vacuum when the container is to be opened. The hole 34 is plugged by the vacuum release valve 30 when the container is evacuated. The vacuum release valve actuator 22 is joined to the body 14 by a living hinge 18. A first recessed area 36 permits the pump 16 to be flush with the upper surface 26 of the body 14 when the container is evacuated. A second recessed area 46 permits the vacuum release valve actuator 22 to lie flush with the upper surface 26 of the lid.

It should be noted that the pump actuator 20 as well as the vacuum release valve actuator 22 extend outward to the periphery of the body 14, and this makes it possible and more convenient for a handicapped person to operate the actuators.

Figure 2:
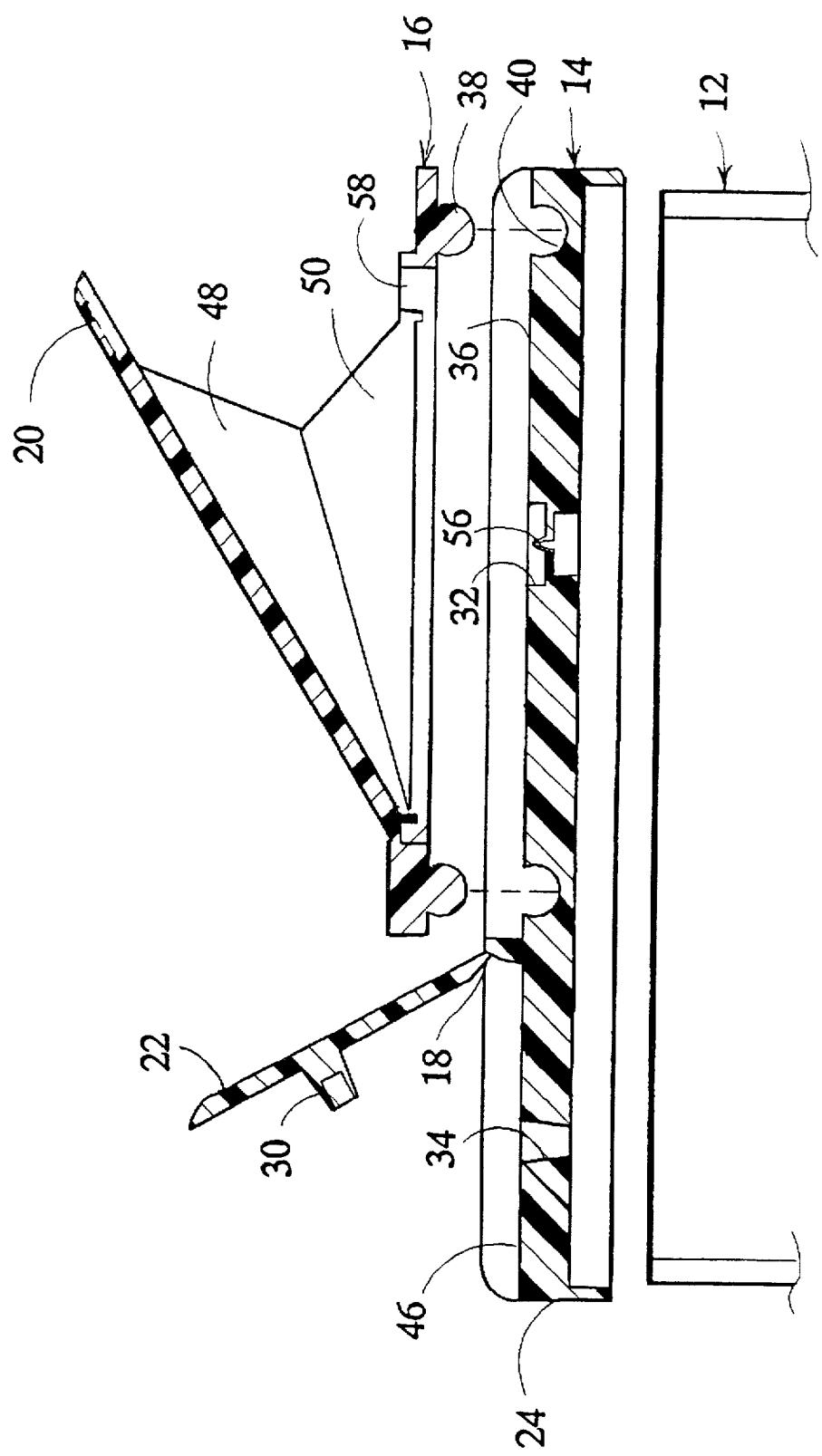
FIG. 2 is an exploded side elevational cross sectional view of the assembled lid; and, FIG. 3 is a front elevational view of the pump used in the preferred embodiment.
Figure 3:
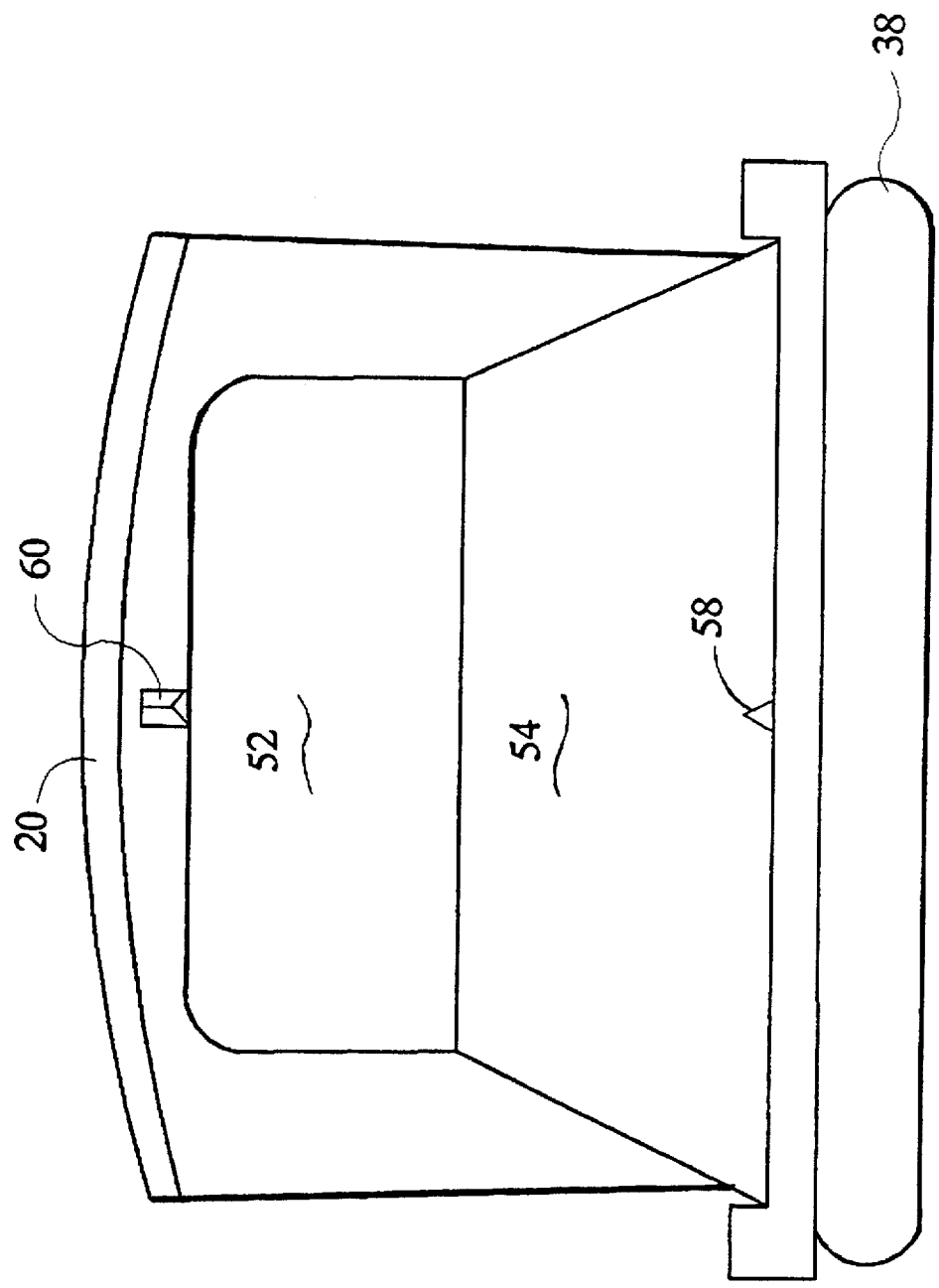

FIG. 2 is an exploded side elevational cross sectional view indicating how the removable pump 16 snaps into the body 14 of the lid and also showing how the body 14 fits onto the container 12. Immediately it is evident that the body 14 can accommodate a range of container diameters. Also, because of the softness of the SANTOPRENE® material of which the lid is made, it is not necessary to include a special sealing ring between the rim of the container and the body 14 of the lid, as was provided in the lid described in U.S. Pat. No. 5,546,997.

As is apparent in FIG. 2, a seal 38 of SANTOPRENE® is molded as an integral part of the removable pump 16. A matching hollow groove 40 is molded into the body 14 of the lid to receive the seal 38. When the lid needs to be cleaned, the removable pump 16 may be pulled loose from the body 14 of the lid, thereby permitting the areas adjacent the seal 38 and the groove 40 to be cleaned.

The bellows includes side panels 48 and 50 and front panels 52 and 54. In the preferred embodiment, the pump actuator 20 serves as the top panel of the bellows, and a bottom panel is not provided because the bellows lies within the area surrounded by the seal 38. Because no bottom panel is provided on the bellows, it becomes possible to mold the entire removable pump 16 as a single piece.

Two valves 56 and 58 are essential for evacuating the container. Both of these valves function as check valves and both are chisel shaped split along a plane centered between the inclined sides of the chisel. These valves are formed in the molding process and are not added components. The surplus of pressure on the inlet side of the valve forces the wedge-shaped portions apart permitting flow. On the other hand, an excess of pneumatic pressure at the outlet side of the valve squeezes the halves together thereby sealing off any flow. The valve 56 permits air to be drawn into the bellows from the container, but the valve 56 close when the bellows is compressed. As the bellows is compressed, the air inside the bellows is forced out through the valve 58 to the atmosphere, but when the pump actuator 20 is pulled up, a partial vacuum is formed within the bellows, and since the pressure within the bellows is less than the atmospheric pressure, the valve 58 closes, keeping atmospheric air from entering the bellows, which are then filled by flow through the valve 56 from the container.

The recessed area 60 provides clearance for the valve 58 when the bellows is fully closed.

Thus there has been described an easily-cleaned reusable lid that includes a removable bellows pump, so that when the lid is placed on a container, air may be evacuated from the container, leaving the stored contents at a reduced air pressure.

It has been seen that when the container is evacuated, the pump actuator and the vacuum release valve actuator are flush with the upper face of the lid, so as not to interfere with stacking of the containers.

The lid consists of two major components, the removable pump, and the body of the lid. Each of these components is molded as a unitary structure in the preferred embodiment, and the removable pump can readily be separated from the body of the lid. This greatly facilitates cleaning the components and the spaces between them. Germs, bits of decaying food, and undesirable odors can therefore be eliminated, which promotes reuse of the lid in addition to better hygiene.

The use of the lid has been made easier for handicapped persons by extending the pump actuator and the vacuum release valve actuator to the periphery of the lid, so that handicapped persons can manipulate the actuators more readily. Although several variations of the lid have been described above, further variations may occur to workers in the art. These additional variations are considered to be within the spirit and scope of the present invention.

What is claimed is:

1. A sanitary lid body for an evacuated container comprising:

a one piece article composed of a soft resilient material and including an integrally molded vacuum release valve through which air can be admitted into the container and integrally molded portions defining a check valve through which air can be withdrawn from the container.

2. The lid body of claim 1 wherein said unitary article further includes portions defining a vacuum release valve actuator that extends outward to the periphery of said lid body.

3. The lid body of claim 1 wherein the container has a rim, and wherein said unitary article further includes a surface that butts against and sealingly engages the rim of the container.

4. The lid body of claim 3 wherein said surface is sized and shaped to accommodate rims of various sizes.

5. A pump for use in evacuating a container closed by a lid body that includes a check valve through which air can be withdrawn from the container, said pump comprising:

a one piece article composed of a soft resilient material and having an integrally molded bellows.

6. The pump of claim 5 wherein said unitary article further includes sealing means for sealingly engaging the lid body and surrounding the check valve of the lid body.

7. The pump of claim 6 wherein said unitary article includes portions defining a check valve through which air can be discharged from inside the bellows to the atmosphere outside the bellows.

8. A lid for evacuating a container, maintaining it in an evacuated state, and for readmitting air into the container, comprising:

a one piece lid body composed of a soft resilient material and including an integrally molded vacuum release valve through which air can be admitted into the container and integrally molded portions defining a check valve through which air can be withdrawn from the container; and, a one piece pump composed of a soft resilient material and including an integrally molded bellows, further including integrally molded portions defining sealing means for sealing and removably engaging said lid body and surrounding the check valve of said lid body, and further including integrally molded portions defining a check valve through which air can be discharged from inside the bellows to the atmosphere outside the bellows.

9. The lid of claim 8 wherein said lid body further includes portions defining a vacuum release valve actuator that extends outward to the periphery of said lid body, and wherein said pump further includes portions defining a pump actuator that extends outward to the periphery of said lid body when said pump is sealingly engaging said lid body.

* * * * *